(12) United States Patent
Han et al.

(10) Patent No.: US 12,051,825 B2
(45) Date of Patent: Jul. 30, 2024

(54) COATED SEPARATOR FOR SECONDARY BATTERY AND METHOD OF MANUFACTURING THE SAME

(71) Applicant: LG ENERGY SOLUTION, LTD., Seoul (KR)

(72) Inventors: Da Kyung Han, Daejeon (KR); Seung Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 534 days.

(21) Appl. No.: 17/420,913

(22) PCT Filed: Jun. 2, 2020

(86) PCT No.: PCT/KR2020/007140
§ 371 (c)(1),
(2) Date: Jul. 6, 2021

(87) PCT Pub. No.: WO2020/256313
PCT Pub. Date: Dec. 24, 2020

(65) Prior Publication Data
US 2022/0069419 A1    Mar. 3, 2022

(30) Foreign Application Priority Data

Jun. 19, 2019  (KR) .................. 10-2019-0072712

(51) Int. Cl.
*H01M 50/451*    (2021.01)
*H01M 4/62*      (2006.01)

(52) U.S. Cl.
CPC ......... *H01M 50/451* (2021.01); *H01M 4/623* (2013.01)

(58) Field of Classification Search
None
See application file for complete search history.

(56) References Cited

U.S. PATENT DOCUMENTS

| | | |
|---|---|---|
| 6,099,630 A | 8/2000 | Kobayashi et al. |
| 2010/0173187 A1 | 7/2010 | Nishikawa et al. |
| 2011/0003209 A1 | 1/2011 | Katayama et al. |
| 2011/0229768 A1 | 9/2011 | Pan et al. |
| 2011/0313085 A1 | 12/2011 | Chen |
| 2013/0149587 A1 | 6/2013 | Yu et al. |
| 2013/0280584 A1 | 10/2013 | Matsumura |
| 2014/0216532 A1 | 8/2014 | Kim et al. |
| 2015/0086714 A1 | 3/2015 | Yu et al. |
| 2015/0171490 A1 | 6/2015 | Kim et al. |
| 2018/0123107 A1* | 5/2018 | Yu .................... H01M 50/451 |
| 2018/0233725 A1 | 8/2018 | Yasuda et al. |
| 2019/0245183 A1 | 8/2019 | Jeong et al. |

FOREIGN PATENT DOCUMENTS

| | | |
|---|---|---|
| CN | 107425169 A | 12/2017 |
| JP | 2-4250 A | 1/1990 |
| JP | 10-116038 A | 5/1998 |
| JP | 2007-311151 A | 11/2007 |
| JP | 4364940 B2 | 11/2009 |
| JP | 2012-14994 A | 1/2012 |
| JP | 2013-26165 A | 2/2013 |
| JP | 2014-35832 A | 2/2014 |
| JP | 2014-67632 A | 4/2014 |
| JP | 2014-510388 A | 4/2014 |
| JP | 2014067632 A * | 4/2014 |
| JP | 2015-511185 A | 4/2015 |
| JP | 2017-16867 A | 1/2017 |
| KR | 10-2009-0051085 A | 5/2009 |
| KR | 10-2011-0070874 A | 6/2011 |
| KR | 10-2013-0134630 A | 12/2013 |
| KR | 10-2015-0084116 A | 7/2015 |
| KR | 10-2015-0125700 A | 11/2015 |
| KR | 10-2017-0087315 A | 7/2017 |
| KR | 10-2018-0022670 A | 3/2018 |
| KR | 10-2018-0093831 A | 8/2018 |
| WO | WO 2012/073996 A1 | 6/2012 |
| WO | WO 2014104687 A1 | 7/2014 |
| WO | WO 2014/136813 A1 | 9/2014 |
| WO | WO 2017/002366 A1 | 1/2017 |

OTHER PUBLICATIONS

English machine translation of JP 2014-067632 (Year: 2014).*
Indian Office Action for Indian Application No. 202117028047, dated May 29, 2023, with English translation.
Extended European Search Report for European Application No. 20825543.0, dated Apr. 5, 2022.
International Search Report for PCT/KR2020/007140 mailed on Sep. 9, 2020.

* cited by examiner

*Primary Examiner* — Scott J. Chmielecki
(74) *Attorney, Agent, or Firm* — Birch, Stewart, Kolasch & Birch, LLP

(57) ABSTRACT

A coated separator for a secondary battery including a separator substrate including a porous polymer resin; and a coating layer present on at least one surface of the separator substrate. The coating layer includes an inorganic material and a coupling agent, the inorganic material comprises a hydroxide of a metal, or a hydroxide of a metal oxide, and the coupling agent is a titanium-based or a silane-based coupling agent.

11 Claims, No Drawings

COATED SEPARATOR FOR SECONDARY BATTERY AND METHOD OF MANUFACTURING THE SAME

TECHNICAL FIELD

This application claims the benefit of priority to Korean Patent Application No. 2019-0072712 filed on Jun. 19, 2019, the disclosure of which is hereby incorporated by reference herein its entirety.

The present invention relates to a coated separator for a secondary battery and a method of manufacturing the same, and particularly, a coated separator for a secondary battery comprising a coupling agent so as to secure dispersibility of a hydroxide of a metal, or a hydroxide of a metal oxide, which is an inorganic component of a separator coating layer, electrode adhesion and heat shrinkage of a separator, and a method of manufacturing the same.

BACKGROUND ART

Since lithium secondary batteries have high output compared to conventional secondary batteries, there is a high interest in securing stability of lithium secondary batteries. A safety-reinforced separator (hereinafter referred to as 'SRS separator') is one of the representative separators for enhancing the safety of lithium secondary batteries. The SRS separator is configured to have a structure in which a coating layer including inorganic particles and a binder is formed on a polyolefin-based substrate, thereby providing high safety against high temperatures.

The coating layer of the SRS separator forms a porous structure by the inorganic particles and the binder and a volume in which a liquid electrolyte solution is placed is increased by virtue of the porous structure. Therefore, lithium ion conductivity and an electrolyte solution impregnation rate of the SRS separator are high. As a result, both the performance and the stability of an electrochemical device using the SRS separator may be improved.

In general, a metal oxide such as alumina ($Al_2O_3$) is used as inorganic particles constituting the coating layer of the SRS separator, and a cyano-based resin is used to secure dispersion force. However, while a metal hydroxide suggested as an alternative inorganic material for the metal oxide has high flame retardancy, the metal hydroxide has weak dispersion force for cyano-based resins.

Therefore, when preparing a slurry for forming the coating layer of the SRS separator, a fatty acid-based dispersant was used to secure dispersion force of the metal hydroxide. However, in the case of using the fatty acid-based dispersant, there is a problem in that heat shrinkage of the SRS separator is increased or electrode adhesion is decreased.

Various attempts have been made to solve the above-mentioned problems.

Patent Document 1 (Japanese Patent Application Publication No. 2017-016867 (2017.01.19)) relates to a coating composition for a secondary battery electrode or a separator containing a vinyl alcohol polymer (A) and a phosphoric acid compound (B), characterized in that the phosphoric acid compound (B) is 1 to 42 parts based on 100 parts of the vinyl alcohol polymer (A).

Patent Document 1 discloses physical properties of the coating composition containing the vinyl alcohol polymer and the phosphoric acid compound, but does not recognize a separator capable of improving dispersion force and adhesion force when a metal hydroxide is used as an inorganic material.

Patent 2 (Korean Document Patent Application Publication No. 2017-0087315 (2017.07.28)) relates to a composite separator for an electrochemical device comprising a porous polymeric substrate and a porous coating layer formed on at least one surface of the porous polymer substrate, the porous coating layer including a binder resin and a plurality of inorganic particles, wherein the binder resin is chemically crosslinked by thermal and/or active energy rays.

Patent Document 2 provides only the effect of using a separator coating layer containing a polyfunctional acrylate as the binder resin and a metal oxide.

In order to form a coating layer of a separator with improved safety, there is a need to improve the technology capable of securing adhesion force with an electrode and improving heat shrinkage while exhibiting uniform physical properties by improving dispersion force of inorganic materials of the separator coating layer, but a clear solution has not yet been proposed.

DISCLOSURE

Technical Problem

The present invention has been made in view of the above problems, and in particular, it is an object of the present invention to provide a coated separator for a secondary battery capable of preventing adhesion force with an electrode from being lowered while forming a uniform coating layer by improving the dispersibility of a separator coating layer including a hydroxide of a metal, or a hydroxide of a metal oxide as an inorganic material, and a method of manufacturing the same.

Technical Solution

In a first aspect of the present invention, the above and other objects can be accomplished by the provision of a coated separator for a secondary battery comprising a separator substrate including a porous polymer resin; and a coating layer present on at least one surface of the separator substrate, wherein the coating layer comprises an inorganic material and a coupling agent, the inorganic material comprises a hydroxide of a metal, or a hydroxide of a metal oxide, and the coupling agent is a titanium-based or a silane-based coupling agent.

In a second aspect of the present invention, the hydroxide of the metal, or the hydroxide of the metal oxide may be represented by the following formula:

$M(OH)_x$ (wherein, in the formula, M is B, Al, Mg, Co, Cu, Fe, Ni, Ti, Au, Hg, Zn, Sn, Zr, or an oxide comprising B, Al, Mg, Co, Cu, Fe, Ni, Ti, Au, Hg, Zn, Sn, or Zr, and x is an integer of 1 to 4).

In a third aspect of the present invention, the coupling agent may include at least one functional group of an alkyl group, an alkoxyl group, or an ester group.

In a fourth aspect of the present invention, an amount of the coupling agent may be 0.5 parts by weight to 30 parts by weight based on 100 parts by weight of the inorganic material.

In a fifth aspect of the present invention, the coating layer may further comprise a dispersant.

In a sixth aspect of the present invention, the dispersant may be at least one selected from an oil-soluble polyamine, an oil-soluble amine compound, a fatty acid, a fatty alcohol, or a sorbitan fatty acid ester.

In a seventh aspect of the present invention, the coating layer may further comprise a binder.

In an eighth aspect of the present invention, the binder may be at least one selected from the group consisting of polyvinylidene fluoride-hexafluoropropylene, polyvinylidene fluoride-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxylmethyl cellulose.

In a ninth aspect of the present invention, the titanium-based coupling agent may be at least one selected from the group consisting of monoalkoxy titanate, neoalkoxy titanate, monoalkoxy-phosphate-based, monoalkoxy phosphate ester-based, monoalkoxy pyrophosphate-based, isopropyl tri(dioctylphosphate) titanate, isopropyl tri(dioctylpyrophosphate) titanate, oleyl titanate, isopropyl trioleyl titanate, isopropyl tristearyl titanate and isopropyl triisostearyl titanate.

In a tenth aspect of the present invention, the silane-based coupling agent may include two or more functional groups selected from the group consisting of a vinyl group, an epoxy group, an amino group, an acryloxy group, a methacryloxy group, a methoxy group, an ethoxy group, a styryl group, an isocyanurate group, and an isocyanate group.

In an eleventh aspect of the present invention, the inorganic material may further comprise a metal oxide, and the metal oxide may be at least one selected from the group consisting of a metal oxide having a dielectric constant of 5 or more, a metal oxide having piezoelectricity, and a metal oxide having lithium ion transfer ability.

In a twelfth aspect of the present invention, the present invention also provides a secondary battery comprising the coated separator for a secondary battery.

BEST MODE

A coated separator for a secondary battery according to the present invention is configured to have a structure in which a coating layer is applied to one surface or both surfaces of a separator substrate including a porous polymer resin.

The separator substrate electrically insulates a negative electrode and a positive electrode to prevent a short circuit while providing movement paths of lithium ions, and a porous film having a high resistance to an electrolyte solution, which is an organic solvent, and having a fine pore diameter may be used. The separator substrate can be used without particular limitation as long as it can be commonly used as a separator material for a secondary battery. For example, the separator substrate may include a resin such as polyolefin-based resin (polyethylene, polypropylene, polybutene, polyvinyl chloride) and a mixture or a copolymer thereof, or a resin such as polyethylene terephthalate, polycycloolefin, polyethersulfone, polyamide, polyimide, polyimideamide, polyaramid, polycycloolefin, nylon, and polytetrafluoroethylene. Thereamong, polyolefin-based resin is preferable, since it has excellent applicability of a slurry for a porous coating layer, and it is capable of increasing capacity per volume by increasing a ratio of an electrode active material layer in a battery by reducing a thickness of a separator for a secondary battery.

An inorganic material used in the coating layer performs a function to improve mechanical strength of a separator. The inorganic material is not particularly limited as long as it uniformly forms a thickness of a coating layer and oxidation and/or reduction reactions do not occur in an operating voltage range of a used secondary battery. In particular, when inorganic particles having ion transfer ability are used, battery performance may be improved by raising ionic conductivity in an electrochemical device. In addition, when the inorganic particles having a high dielectric constant are used, a dissociation degree of an electrolyte salt in a liquid electrolyte, namely, a lithium salt, is increased and thereby ionic conductivity of an electrolyte may be improved.

Specifically, as the inorganic material, alumina ($Al_2O_3$) has often been used in the past. However, the use of a hydroxide of a metal, or a hydroxide of a metal oxide has recently been increasing for the purpose of improving flame retardancy.

The hydroxide of the metal, or the hydroxide of the metal oxide may be represented by the following formula, and preferably, aluminum hydroxide (Aluminum trihydroxide, $Al(OH)_3$) and/or AlOOH may be used.

$M(OH)_x$ (wherein, in the formula, M is B, Al, Mg, Co, Cu, Fe, Ni, Ti, Au, Hg, Zn, Sn, Zr, or an oxide thereof, and x is an integer of 1 to 4.)

The particle size of the inorganic material is not particularly limited. However, considering the purpose of forming a coating layer having uniform thickness and providing proper porosity, the particle size of the inorganic material may have a D50 of 20 nm to 10 μm, and specifically, 100 nm to 2 μm.

D50 means a particle diameter corresponding to 50% of a cumulative number of particles in a particle size distribution curve. The average diameter of inorganic particles was measured using a particle size analyzer (Product name: MASTERSIZER 3000; Manufacturer: Malvern).

The amount of the inorganic material may be 50 parts by weight to 95 parts by weight based on the total weight of the solid content of the coating layer, and specifically, it may be 60 parts by weight to 95 parts by weight. When the amount of the inorganic material is less than 50 parts by weight based on the total weight of the solid content of the coating layer, empty spaces formed between the inorganic particles are reduced since an amount of a binder becomes too large, thereby reducing pore size and porosity and resulting in deteriorating battery performance, which is undesirable. When the amount of the inorganic material exceeds 95 parts by weight based on the total weight of the solid content of the coating layer, adhesion force between inorganic materials are weakened since an amount of a binder is too small, thereby deteriorating mechanical properties of the separator itself, which is undesirable.

Conventionally, when a metal hydroxide is used to manufacture a separator coating layer, dispersion power can be secured by using a fatty acid-based dispersant in which various acid-based components such as palmitic acid and oleic acid are present as a mixture. However, the coating separator manufactured by using the fatty acid-based dispersant has a problem of high heat shrinkage and low electrode adhesion.

In order to solve the above problems, the present invention uses a titanium (titanate)-based or silane-based coupling agent when preparing a coating layer slurry.

The coupling agent may include at least one functional group of an alkyl group, an alkoxyl group, and an ester group.

The titanium-based coupling agent may be any one selected from the group consisting of monoalkoxy titanate, neoalkoxy titanate, isopropyl tri (dioctylphosphate) titanate, isopropyl tri (dioctylpyrophosphate) titanate, oleyl titanate, isopropyl trioleyl titanate, isopropyl tristearyl titanate, and isopropyl triisostearyl titanate, di(dioctylpyrrophosphate) ethylene titanate, monoalkoxy-phosphate-based, monoalkoxy phosphate ester-based, and monoalkoxy pyrophosphate, or a mixture of two or more thereof.

The silane-based coupling agent may include two or more functional groups selected from the group consisting of a vinyl group, an epoxy group, an amino group, an acryloxy group, a methacryloxy group, a methoxy group, an ethoxy group, a styryl group, an isocyanurate group, and an isocyanate group.

For example, the silane-based coupling agent may have a vinyl group, an epoxy group, an amino group, an acryloxy group, or a methacryloxy group bonded to one side, and may have a methoxy group or an ethoxy group bonded to the other side.

The amount of the coupling agent may be 0.5 parts by weight to 30 parts by weight based on 100 parts by weight of the inorganic material, particularly, 1 part by weight to 10 parts by weight based on 100 parts by weight of the inorganic material, and more particularly, 1 part by weight to 5 parts by weight based on 100 parts by weight of the inorganic material.

When the amount of the coupling agent is less than 0.5 parts by weight based on the amount of the inorganic material, dispersibility is not secured. When the amount of the coupling agent is greater than 30 parts by weight based on the amount of the inorganic material, it is difficult to exert the effect of improving heat shrinkage and electrode adhesion, which is undesirable.

The coating layer may further include a dispersant in order to further improve dispersibility of a hydroxide of a metal, or a hydroxide of a metal oxide. The dispersant functions to maintain a uniform dispersion state of the hydroxide of the metal, or the hydroxide of the metal oxide in the binder when preparing the coating layer slurry. For example, the dispersant may be at least one selected from an oil-soluble polyamine, an oil-soluble amine compound, a fatty acid, a fatty alcohol, and a sorbitan fatty acid ester. Specifically, the dispersant may be a high molecular weight polyamine amide carboxylic acid salt. The amount of the dispersant may be 0.2 parts by weight to 10 parts by weight based on 100 parts by weight of the inorganic material. When the dispersant is included in an amount of less than 0.2 parts by weight based on 100 parts by weight of the inorganic material, there is a problem in that the inorganic material is easily sunk. On the contrary, when the dispersant is included in amount exceeding 10 parts by weight, there are problems in that adhesion force of the coating layer to the separator substrate is reduced, or impurities are generated by reacting with an electrolyte when manufacturing a secondary battery.

The coating layer may further include a binder. The binder serves to stably fix the inorganic material on a surface of the separator substrate. For example, the binder may be any one selected from the group consisting of polyvinylidene fluoride-hexafluoropropylene, polyvinylidene fluoride-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxylmethyl cellulose, or a mixture of two or more thereof.

The coated separator for a secondary battery according to the present invention is manufactured by dissolving an inorganic material, a binder, and a coupling agent in a solvent to prepare a slurry in order to prepare a coating layer, coating the slurry on a separator substrate, and drying it thereafter. Therefore, it is preferable that the solvent is capable of dispersing the inorganic material and the binder uniformly, and the solvent may be easily removed thereafter. Non-limiting examples of solvents usable include acetone, tetrahydrofuran, methylene chloride, chloroform, dimethylformamide, N-methyl-2-pyrrolidone (NMP), cyclohexane, water, or a mixture thereof.

The slurry is coated on one surface or both surfaces of a separator substrate to form a separator coating layer. The slurry can be coated on the separator substrate by a technique well-known in the art, for example, dip coating, die coating, roll coating, comma coating, and a combination thereof.

Meanwhile, the coated separator for a secondary battery according to the present invention may be used by further mixing a metal oxide in addition to the hydroxide of the metal, or the hydroxide of the metal oxide in the coating layer.

The type of the metal oxide is not particularly limited. For example, the metal oxide may be at least one selected from the group consisting of a metal oxide having a dielectric constant of 5 or more, a metal oxide having piezoelectricity, and a metal oxide having lithium ion transfer ability.

The metal oxide having a dielectric constant of 5 or more may be $SiO_2$, $SrTiO_3$, $SnO_2$, $CeO_2$, $MgO$, $NiO$, $CaO$, $ZnO$, $ZrO_2$, $Y_2O_3$, $Al_2O_3$ or $TiO_2$.

In the metal oxide having piezoelectricity, one side of the particles is positively charged and the other side thereof is negatively charged to cause a potential difference between both sides, when a predetermined pressure is applied. The metal oxide having piezoelectricity may be at least one selected from the group consisting of $BaTiO_3$, $Pb(Zr_xTi_{1-x})O_3$ (PZT, where $0<x<1$), $Pb_{1-x}La_xZr_{1-y}Ti_yO_3$ (PLZT, where $0<x<1$ and $0<y<1$), $(1-x)\ Pb(Mg_{1/3}Nb_{2/3})O_3$-$xPbTiO_3$ (PMN-PT, where $0<x<1$), hafnia ($HfO_2$), and a combination thereof.

The metal oxide having lithium ion transfer ability contains lithium elements, but does not store lithium elements and transfer lithium ions. The metal oxide having lithium ion transfer ability may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glasses ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, and a combination thereof.

Additionally, in addition to the metal oxide, the metal oxide having lithium ion transfer ability may further include at least one selected from the group consisting of lithium nitride ($Li_xN_y$, $0<x<4$, $0<y<2$) such as $Li_3N$, $SiS_2$-based glasses ($Li_xSi_yS_z$, $0<x<3$, $0<y<2$, $0<z<4$) such as $Li_3PO_4$—$Li_2S$—$SiS_2$, $P_2S_5$-based glasses ($Li_xP_yS_z$, $0<x<3$, $0<y<3$, $0<z<7$) such as $LiI$—$Li_2S$—$P_2S_5$, and a combination thereof.

As an inorganic material included in the separator coating layer, the metal oxide may be included in an amount of 40 parts by weight or less based on 100 parts by weight of the hydroxide of the metal, or the hydroxide of the metal oxide.

When the amount of the metal oxide exceeds 40 parts by weight, flame retardancy is lowered, whereby affecting the safety of the secondary battery, which is undesirable.

Hereinafter, the present invention will be described with reference to the following examples. These examples are provided only for illustration of the present invention and should not be construed as limiting the scope of the present invention.

Example 1

32 wt % of polyvinylidene fluoride-hexafluoropropylene having a weight average molecular weight of 500,000 and 15 parts by weight of hexafluoropropylene, 1.5 wt % of cyanoethylpolyvinyl alcohol having a weight average molecular weight of 400,000, 65 wt % of aluminum hydroxide (Al(OH)$_3$) having 800 nm of D50 as an inorganic material, and 1.5 wt % of oleyl titanate as a titanium-based coupling agent were added to acetone and mixed to prepare a slurry for a separator coating layer. A solid content of the final slurry is 16 wt %.

The slurry for a separator coating layer was coated to a thickness of 4 μm on both surfaces of a separator substrate made of a porous polymer resin of a polyolefin-based material having a thickness of 9 μm, and gas-state water vapor was introduced into a steambox and dried at 25° C. for 10 minutes to manufacture a coated separator for a secondary battery.

Example 2

A coated separator for a secondary battery was manufactured using the same method as in Example 1, except that 1.5 wt % of vinyl trimethoxysilane as a silane-based coupling agent was used, instead of using 1.5 wt % of oleyl titanate in Example 1.

Comparative Example 1

A coated separator for a secondary battery was manufactured using the same method as in Example 1, except that 3 wt % of cyanoethylpolyvinyl alcohol was used, instead of using 1.5 wt % of cyanoethylpolyvinyl alcohol and 1.5 wt % of oleyl titanate in Example 1.

Comparative Example 2

A coated separator for a secondary battery was manufactured using the same method as in Example 1, except that 1.5 wt % of a fatty acid-based dispersant was used, instead of using 1.5 wt % of oleyl titanate in Example 1.

<Experimental Example 1> Evaluation of Adhesion Force

Four electrodes having a length of 60 mm and a width of 25 mm are prepared, and each of the separators manufactured in Example 1, Example 2, Comparative Example 1 and Comparative Example 2 are prepared with a length of 70 mm and a width of 25 mm. Each of the electrodes and each of the separators are placed to overlap each other, and pressurized at 90° C. and 8.5 MPa for 1 second to attach the electrode and the separator.

After attaching a double-sided tape to a glass substrate and attaching the electrode adhered to the double-sided tape, the separator attached to the electrode was pulled at a peeling rate of 300 mm/min and a peeling angle of 180°, and the force required to completely separate the separator was measured using Universal Testing Machine (UTM) (Manufacturer: Instron, Product name: 3345).

<Experimental Example 2> Measurement of Sedimentation Rate and Particle Size

The sedimentation rate was measured over time after being subjected to a centrifugal force by placing each of the slurries prepared in Example 1, Example 2, Comparative Example 1 and Comparative Example 2 in a Dispersion Analyzer (Product name: Lumisizer, Manufacturer: LUM) and spinning at a speed of 1,000 rpm.

In addition, the average particle diameter of inorganic particles contained in each of the slurries was measured using a Particle Size Analyzer (Product name: MASTERSIZER 3000; Manufacturer: Malvern).

<Experimental Example 3> Evaluation of Heat Shrinkage

Each of the separators manufactured in Example 1, Example 2, Comparative Example 1 and Comparative Example 2 was cut into a size of a length of 50 mm and a width of 50 mm, and then was allowed to stand in a convention oven at 150° C. for 30 minutes to measure the heat shrinkage (MD/TD).

The results of Experimental Example 1 to Experimental Example 3 are shown in Table 1.

TABLE 1

| | Example 1 | Example 2 | Comparative Example 1 | Comparative Example 2 |
|---|---|---|---|---|
| Adhesive force (gf/25 mm) | 70 | 65 | 52 | Less than 10 |
| Particle size (D50) (μm) | 4 or less | 4 or less | 16 | 4 or less |
| Sedimentation rate (μm/s) | 10 or less | 10 or less | 100 or more | 10 or less |
| Heat shrinkage (MD/TD*) | 13/11 | 15/12 | 15/12 | 45/45 |

*MD (= Machine Direction), TD (= Transverse Direction)

Referring to Table 1, the separator of Comparative Example 2 using the fatty acid-based dispersant without using a coupling agent has a remarkably low adhesion force, and thus, there is a problem of bonding to the electrode. On the other hand, the separators of Examples 1 and 2 are capable of bonding stably to the electrode.

When comparing the sedimentation rate and particle size (D50), in the slurry of Example 1, the particle size of the inorganic material was measured to be 4 μm or less and the sedimentation rate was measured to be 10 μm/s or less. On the other hand, in the slurry of Comparative Example 1, the particle size of the inorganic material was measured to be 16 μm and the sedimentation rate was measured to be 100 μm/s or more. That is, the slurries of Examples 1 and 2 were measured to have a small particle size of inorganic particles due to excellent dispersion force of inorganic material, and the slurry of Comparative Example 1 was measured to have a large particle size and high sedimentation rate because the agglomeration of inorganic particles is large due to low dispersion force of inorganic material.

When comparing the heat shrinkage, the heat shrinkage of the separator of Comparative Example 2 was measured to be about 4 times larger than that of the separator of Example 1, and the shrinkage of the separator of Comparative Example 2 was significantly increased in both MD and TD directions.

Therefore, when manufacturing a secondary battery using the separator of Comparative Example 2, it is expected that when the temperature of the secondary battery increases, the positive electrode and the negative electrode come into contact with each other due to shrinkage of the separator, easily causing a short circuit.

Although described above with reference to examples of the present invention, those skilled in the art to which the present invention pertains will appreciate that various applications and modifications are possible based on the above description, without departing from the scope of the present invention.

INDUSTRIAL APPLICABILITY

As is apparent from the above description, since a coated separator for a secondary battery according to the present invention uses a hydroxide of a metal, or a hydroxide of a metal oxide as an inorganic material of a coating layer, it is possible to secure flame retardancy compared to the case using a conventional metal oxide.

In addition, as the coupling agent is used, the dispersion force of the hydroxide of the metal, or the hydroxide of the metal oxide can be secured, while the heat shrinkage and electrode adhesion of the separator can be improved.

Accordingly, it is possible to prevent problems in that the separator shrinks at a high temperature or decreases in adhesion force, and thus a secondary battery with improved safety can be provided.

The invention claimed is:

1. A coated separator for a secondary battery comprising:
a separator substrate comprising a porous polymer resin; and
a coating layer present on at least one surface of the separator substrate, wherein the coating layer comprises an inorganic material and a coupling agent, the inorganic material comprises a hydroxide of a metal, or a hydroxide of a metal oxide, and the coupling agent is a titanium-based coupling agent or a silane-based coupling agent,
wherein the coating layer further comprises a dispersant, and an amount of the dispersant is 0.2 parts by weight to 10 parts by weight based on 100 parts by weight of the inorganic material.

2. The coated separator for a secondary battery according to claim 1, wherein the hydroxide of the metal, or the hydroxide of the metal oxide is represented by the following formula:

$$M(OH)_x$$

wherein, in the formula, M is B, Al, Mg, Co, Cu, Fe, Ni, Ti, Au, Hg, Zn, Sn, Zr, or an oxide comprising B, Al, Mg, Co, Cu, Fe, Ni, Ti, Au, Hg, Zn, Sn, or Zr, and x is an integer of 1 to 4.

3. The coated separator for a secondary battery according to claim 1, wherein the coupling agent is a material comprising at least one functional group of an alkyl group, an alkoxyl group, or an ester group.

4. The coated separator for a secondary battery according to claim 1, wherein an amount of the coupling agent is 0.5 parts by weight to 30 parts by weight based on 100 parts by weight of the inorganic material.

5. The coated separator for a secondary battery according to claim 1, wherein the dispersant is at least one selected from an oil-soluble polyamine, an oil-soluble amine compound, a fatty acid, a fatty alcohol, or a sorbitan fatty acid ester.

6. The coated separator for a secondary battery according to claim 1, wherein the coating layer further comprises a binder.

7. The coated separator for a secondary battery according to claim 6, wherein the binder is at least one selected from the group consisting of polyvinylidene fluoride-hexafluoropropylene, polyvinylidene fluoride-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, and carboxylmethyl cellulose.

8. The coated separator for a secondary battery according to claim 1, wherein the titanium-based coupling agent is at least one selected from the group consisting of monoalkoxy titanate, neoalkoxy titanate, isopropyl tri(dioctylphosphate) titanate, isopropyl tri(dioctylpyrophosphate) titanate, oleyl titanate, isopropyl trioleyl titanate, isopropyl tristearyl titanate and isopropyl triisostearyl titanate, di(dioctylpyrophosphate)ethylene titanate, monoalkoxy-phosphate-based, monoalkoxy phosphate ester-based, and monoalkoxy pyrophosphate-based.

9. The coated separator for a secondary battery according to claim 1, wherein the silane-based coupling agent comprises two or more functional groups selected from the group consisting of a vinyl group, an epoxy group, an amino group, an acryloxy group, a methacryloxy group, a methoxy group, an ethoxy group, a styryl group, an isocyanurate group, and an isocyanate group.

10. The coated separator for a secondary battery according to claim 1, wherein the inorganic material further comprises a metal oxide, wherein the metal oxide is at least one selected from the group consisting of a metal oxide having a dielectric constant of 5 or more, a metal oxide having piezoelectricity, and a metal oxide having lithium ion transfer ability.

11. A secondary battery comprising the coated separator for a secondary battery according to claim 1.

* * * * *